(12) United States Patent
Kim et al.

(10) Patent No.: US 7,747,006 B2
(45) Date of Patent: Jun. 29, 2010

(54) HANDSET AND BASE UNIT WITH SEMI-TRANSLUCENT FINISH

(75) Inventors: Catherine Sayim Kim, Seattle, WA (US); Kabir Siddiqui, Sammamish, WA (US); Hok-Sum Horace Luke, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 885 days.

(21) Appl. No.: 11/487,450

(22) Filed: Jul. 17, 2006

(65) Prior Publication Data

US 2008/0044001 A1 Feb. 21, 2008

(51) Int. Cl.
*H04M 9/00* (2006.01)
*H04M 1/00* (2006.01)
*H02J 7/00* (2006.01)

(52) U.S. Cl. .................... 379/434; 455/575.1; 320/115

(58) Field of Classification Search ................ 379/368, 379/369, 370, 433.01, 433.06, 433.07, 434; 455/90.2, 90.3, 550.1, 556.1, 556.2, 575.1; 320/107, 114–115
See application file for complete search history.

(56) References Cited

U.S. PATENT DOCUMENTS 6,049,192 A * 4/2000 Kfoury et al. .............. 320/113
2006/0058073 A1 * 3/2006 Kim ........................... 455/573
2008/0015934 A1 * 1/2008 Kim et al. .................... 705/14
2009/0080679 A1 * 3/2009 Rass ........................... 381/322

OTHER PUBLICATIONS http://nds2.nokia.com/tutorials/support/global/phones/7280/english/index.html, Nokia 7280 Interactive Demonstrations, Nokia 7280 User Guide, 6 Sheets, 2004.

* cited by examiner

*Primary Examiner*—Fan Tsang
*Assistant Examiner*—Phylesha Dabney
(74) *Attorney, Agent, or Firm*—Merchant & Gould

(57) ABSTRACT

An electronic device, such as a handset for providing telephonic communication, having a semi-translucent finish is provided. The handset generally includes a front cover with a display region, an input region and a back cover. The front cover may be formed of a transparent material, such as plastic and be covered by a semi-translucent vacuum metallized thin film. The handset includes an active mode wherein a display panel is illuminated and is visible through the thin film, and a standby mode wherein the display panel is not illuminated and not visible and, instead, the front cover appears as a continuous surface with a metallic finish. The handset also includes a base unit with an outer area that may change color to indicate the handset is properly positioned within the base unit. The base unit also includes electrical contacts to act as a charging unit.

20 Claims, 13 Drawing Sheets

HANDSET AND BASE UNIT WITH SEMI-TRANSLUCENT FINISH

BACKGROUND

Many electronic devices today are designed and manufacturing using a variety of parts and colors. In particular, handsets for telephonic communications, such as cell phones, often include several keys or buttons for accessing a variety of menus or features, on the front of the handset as well as the sides. Some handsets now include a qwerty type keypad in addition to a standard alphanumeric keypad.

This multitude of buttons and keys, along with the display panel, often make a handset look complicated and busy. As handsets continue to include additional features and capabilities, they are likely to include more buttons, further complicating the input region. Simplification of handsets will provide a sleeker, more modern handset.

SUMMARY

An electronic device, such as a handset for providing telephonic communication, with a semi-translucent finish generally includes a front cover and a back cover. The front cover includes a display region and an input region. The input region includes a keypad having keypad graphics and a function key. The front cover is generally formed of a translucent material, such as plastic. In addition, the front cover includes a semi-translucent vacuum metallized thin film layer covering the top surface of the front cover.

The handset includes two modes of operation when powered on. The first is an active mode. When in active mode, a display panel, located between the front and back covers, is illuminated. The illuminated display panel shines through the semi-translucent thin film covering the front cover, allowing the display panel to be visible to the user.

The handset also includes a standby mode. When in standby mode, the display panel is not illuminated and is therefore not visible through the thin film layer. Rather, the thin film layer provides a metallic finish to the top surface of the front cover. This provides the appearance of a generally continuous, smooth surface for the top cover of the handset and provides a simple appearance for the handset. The handset may also have a similar appearance when it is powered off.

In addition, the handset includes a base unit. The base unit may act as a charging unit and may also provide a cradle for storing or packaging the handset. The base unit may have a corresponding top cover that mates to the base unit for storage or packaging. The exterior surface of the base unit and top cover generally include a finish similar to that of the handset, in order to maintain the simple appearance of the handset.

The base unit generally includes a recessed area or cradle in which the handset will nest when in the unit. The base unit also includes an outer area surrounding the recessed area. The outer area may change color to indicate that the handset is nested within the recessed area or has been removed. For example, the outer area may have generally metallic appearance, similar to that of the handset, when the handset is properly nested within the base unit. When the handset is removed, the outer area may change color and be illuminated to indicate that the handset has been removed.

In addition, the base unit may also act as a charging unit for the handset. Electrical contacts may be positioned within the recessed area. When the handset is properly nested within the recessed area, the handset will charge. The outer area may change color from the generally metallic appearance to an illuminated color to indicate that the handset is charging.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Aspects of the invention are illustrated by way of example and not limited in the accompanying figures in which like reference numerals indicate similar elements and in which.

DETAILED DESCRIPTION

Figure 1:
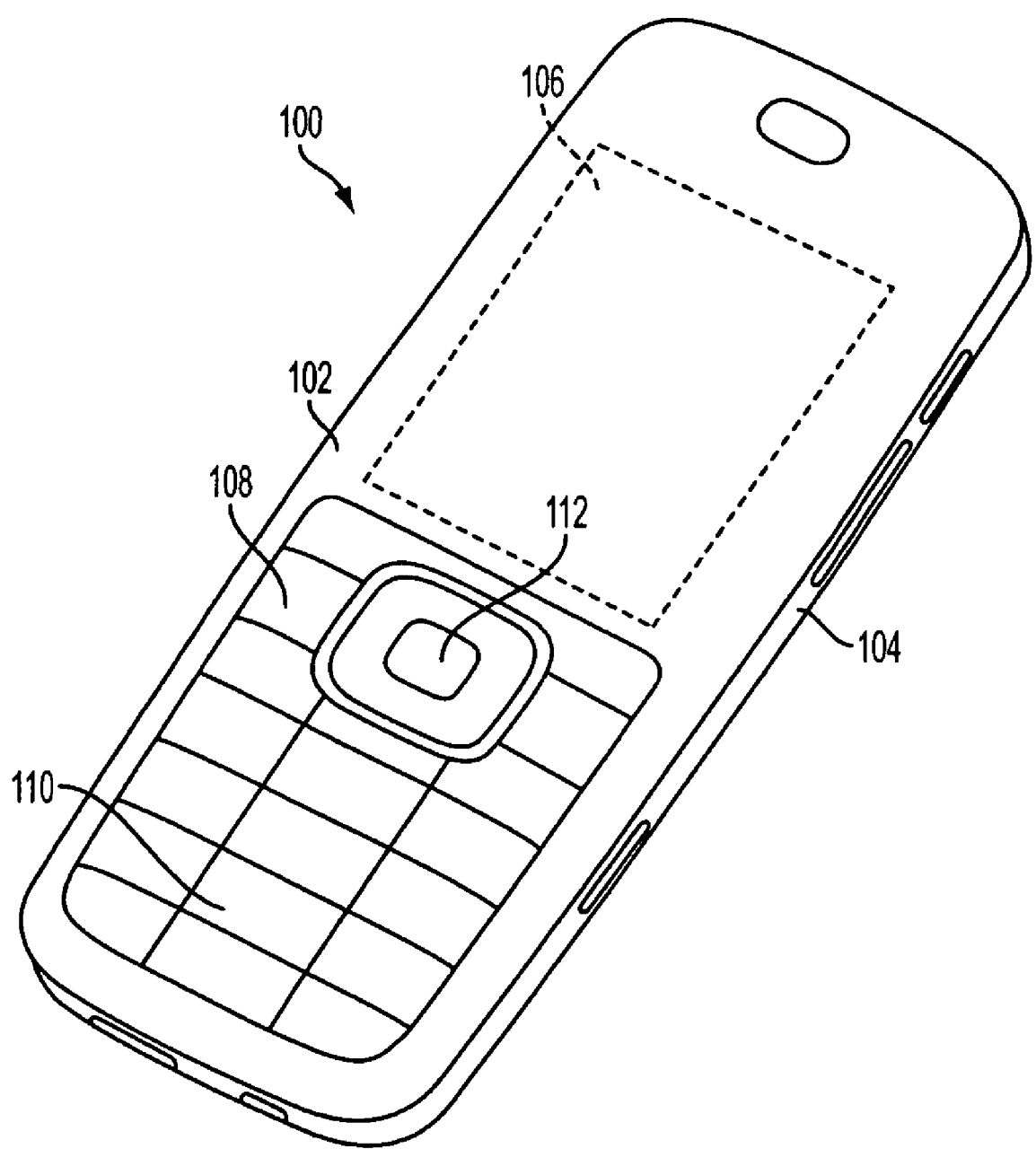
FIG. 1 is a perspective view of a handset having a semi-translucent metallic finish, according to one arrangement.

FIG. 1 is a perspective view of handset for providing telephonic communication 100 having a semi-translucent metallic finish to provide a simple, modern-looking handset. Although a handset, such as a cell phone, land-line type telephone, is used throughout this application as an exemplary electronic device to which the semi-translucent finish may be applied, the semi-translucent finish is in no way limited to use only on handsets. Rather, the semi-translucent finish and method of applying it may be used on any electronic device, such as a personal digital assistants, etc.

Further to FIG. 1, the handset 100 includes a front cover 102 and a back cover 104. The front cover 102 includes a display area 106, shown enclosed by a broken line. In addition, the front cover includes an input region 108. The input region 108 includes an alphanumeric keypad 110. In addition, the input region 108 may include a function key region 112. The function key region 112 may include a single key configured for input in multiple directions, or a plurality of keys for moving a cursor or selecting an icon.

Figure 4:
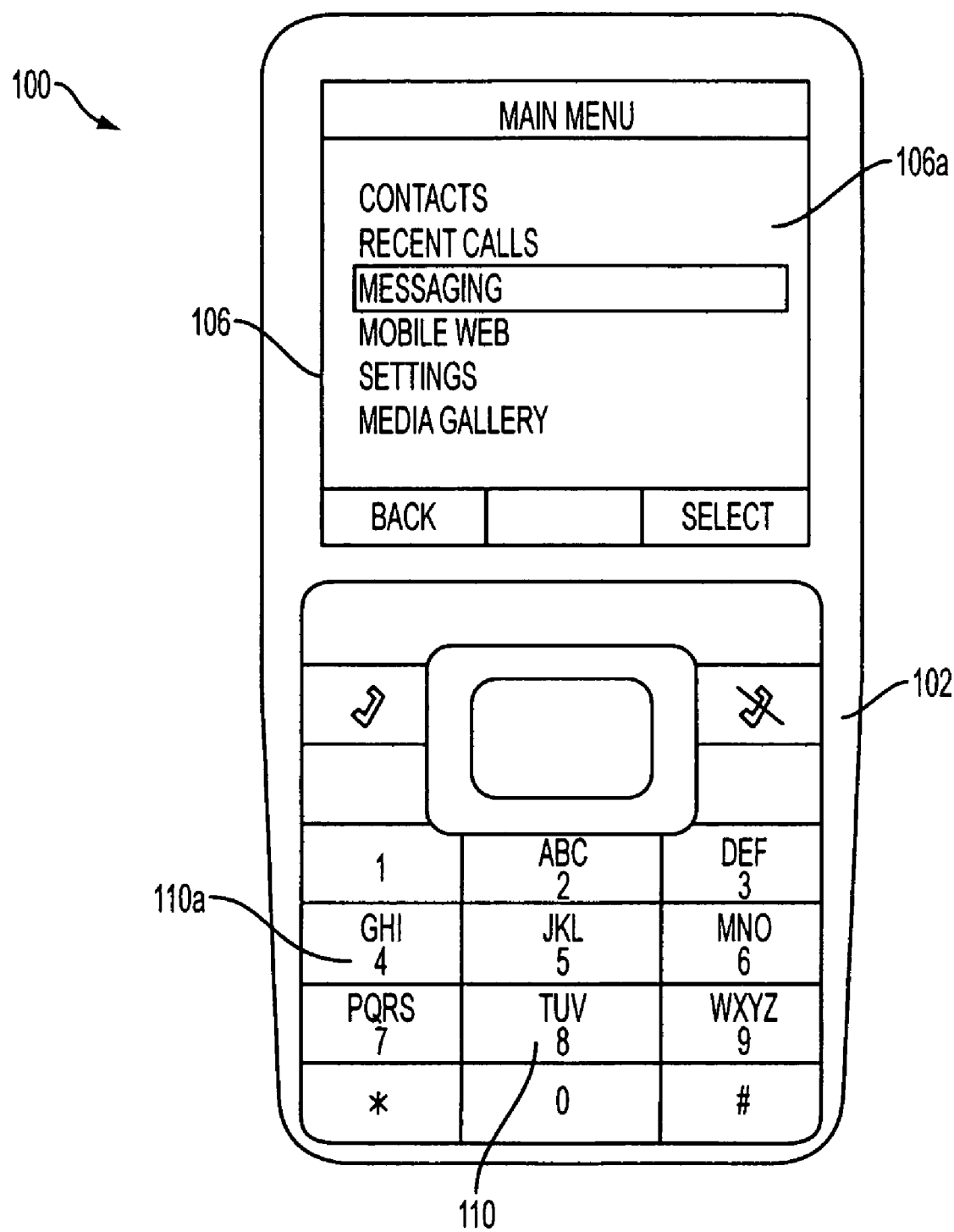
FIG. 4 is a front view of the handset of FIG. 1 as it may appear in active mode.

As shown in FIG. 1, the display area 106 is part of the continuous surface of the handset 100. For instance, the display area 106 can not be differentiated from the handset. The continuous surface is maintained regardless of the mode in which the handset 100 is operating. FIG. 4 depicts the handset 100 as it may appear in an active mode. In FIG. 4, a display panel 106a is visible, although it does not disrupt the continuous surface of the handset 100. Rather, the display panel 106a is illuminated, allowing it to be seen through the semi-translucent finish of the handset 100. In particular, the main menu is visible. The visibility of the display 106a, as well as the active and dormant modes of the handset 100, will be discussed further below.

With further reference to FIG. 1, the front cover 102 appears as a continuous surface. This continuous surface includes a metallic finish over the front cover 102. For example, the front cover 102 may appear with a chrome finish over the display area 106 and input region 108. This chrome finish may minimize part breaks on the front cover 102 and provide a uniform, continuous appearance for the handset 100.

The handset 100 of FIG. 1 may also include a back cover 104. This cover 104 may also have a continuous surface with a metallic finish similar to that of the front cover 102. Alternatively, the back cover 104 may have a finish that is complementary of the finish on the front cover 102, rather than having a similar or identical finish. For example, the front cover 102 may have a chrome finish while the back cover 104 may have a matte gray finish.

The front and back covers 102, 104 of the handset 100 may be made of any suitable material, such as plastic. In one illustrative example, the covers 102, 104 are made of polycarbonate. The material chosen for the front cover 102 is transparent to allow the illuminated display panel 106a to be visible through the front cover 102. Alternatively, the front cover 102 material may be transparent in the display region 106 and translucent or opaque in the remaining portions of the front cover 102. The back cover 104 may be transparent, translucent or opaque.

Figure 2:
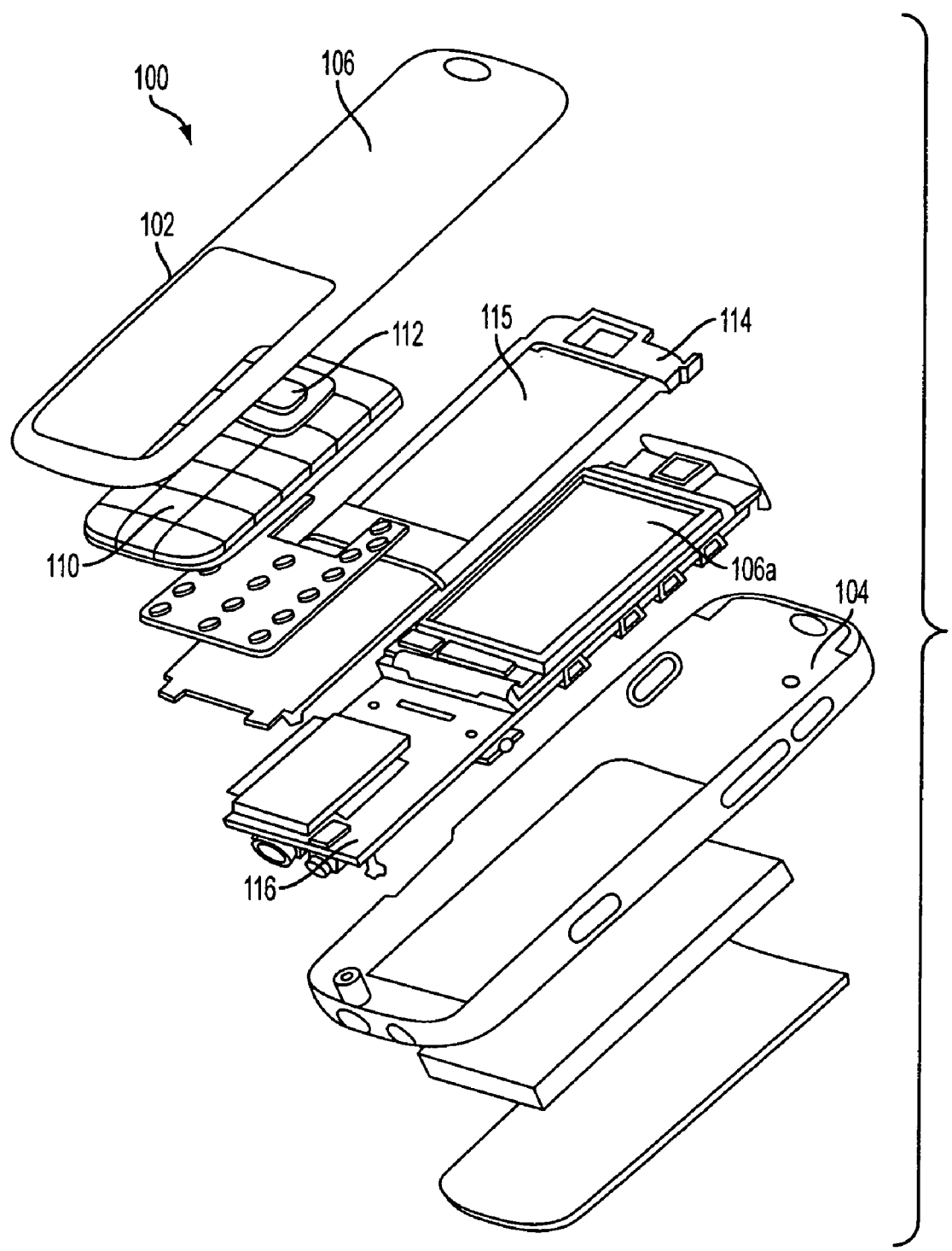
FIG. 2 is an exploded view of the handset of FIG. 1, as seen from the front of the handset.

FIG. 2 is an exploded view of the handset 100 of FIG. 1, as seen from the front of the handset 100. The front cover 102 of FIG. 2 is shown with a continuous, metallic finish. The display 106a itself is not visible through the front cover, as the handset 100 appears in standby mode, however the display region 106 is visible.

The front cover 102 includes a vacuum metallized thin film finish applied to the top surface of the front cover 102 to provide the metallic finish. The metallized film may be applied as opaque or semi-translucent. When applied as semi-translucent, light can be emitted through the film. The light emitted will allow a user to view an illuminated object beneath the front cover 102. For example, a semi-translucent metallized film may be applied to the display region 106 of the front cover 102. Although the actual display panel 106a is located on a printed circuit board 116 between the front 102 and back 104 covers of the handset 100, when the display panel 106a is illuminated, the light will pass through the semi-translucent metallized thin film coating the display region 106 and allow a user to view the display panel 106a.

The metallized film may be pre-cut to fit the front cover 102. Alternatively, the film may be placed on the front cover 102 and then trimmed to align with the edges of the front cover 102. The metallized film may provide a variety of finishes for the front cover 102. For instance, the metallized film may produce a standard chrome or mirror finish. In addition, the film may produce a dark chrome or color tinted chrome (i.e., blue metallic, red metallic, etc.) finish.

Further to FIG. 2, the keypad 110 is shown. The keypad 110 is generally a single piece formed of any suitable material, such as plastic. Alternatively, the keypad 110 may be a multi-piece construction formed of a suitable material. The keypad 110 is positioned beneath the front cover 102 when the handset 100 is assembled. However, the front surface of the keypad 110 is generally flush with the front surface of the front cover 102 when the handset 100 is assembled. This arrangement provides a smooth continuous surface for the handset 100 with a minimum of part breaks, aiding in the simple, modern appearance of the handset. In another illustrative embodiment, the keypad may not be a smooth, continuous surface. Rather, the keypad 110 may include surface that may be angled relative to each other.

A metallized film may also be applied to the keypad 110 to provide a metallic finish, similar or identical to the metallic finish on the front cover 102. The film may be pre-cut to fit the keypad 110 or may be applied to the keypad 110 then trimmed to align with the front surface of the keypad 110.

The keypad 110 may include a plurality of indicia on each of the buttons. For example, a button may include a number and three letters that may be accessed by pressing that button. In addition, some buttons may include symbols such as a telephone receiver to identify the send button or a telephone received with a line diagonally across it to identify the end button. The metallized film applied to the keypad 110 may be semi-translucent in the areas covering the indicia. This configuration will allow light emitted from below the keypad 110 to shine through the indicia when the handset 100 is in active mode. This will allow a user to more easily identify the buttons being pressed. When the handset 100 is in standby mode, the indicia of the keypad 110 may not be visible. Rather, the keypad 110 will have a continuous, metallic finish, similar to the finish covering the front cover 102, without any visible markings.

The keypad 110 may also include a function key 112. The function key 112 may be a single, multi-directional button or a plurality of buttons for moving in several directions. The function key 112 may also include a select key to select a menu option once it has been chosen by the user. The function key 112 of FIG. 2 is part of the single piece construction of the keypad 110. Alternatively, the function key 112 may be a separate piece made from a material similar to that of the keypad 110.

With further reference to FIG. 2, the handset 100 also includes a chassis 114. The chassis 114 may be made of any suitable material to provide support to the various parts of the handset 100. In one illustrative example, the chassis 114 is made of magnesium. The chassis 114 provides structural support for the printed circuit board 116, display panel 106a, keypad 110 and front cover 102. The chassis 114 includes a substantial opening 115, aligned with the display panel 106a on the printed circuit board 116 and the display region 106 on the front cover 102, to allow the display panel 106a to abut the back side of the front cover 102.

Arranged just below the chassis 114 is a printed circuit board assembly 116. The printed circuit board assembly 116 includes a display panel 106a. The display panel 106a is positioned to protrude through the substantial opening 115 in the chassis 114 and to abut the back surface of the front cover 102. The contact between the display panel 106a and the front cover 102 may aid in visibility of the display panel 106a through the thin film on the front cover 102 when the display 106a is illuminated. In addition, the front cover 102 acts as a protective barrier to prevent scratches or other damage to the display panel 106a.

Figure 3:
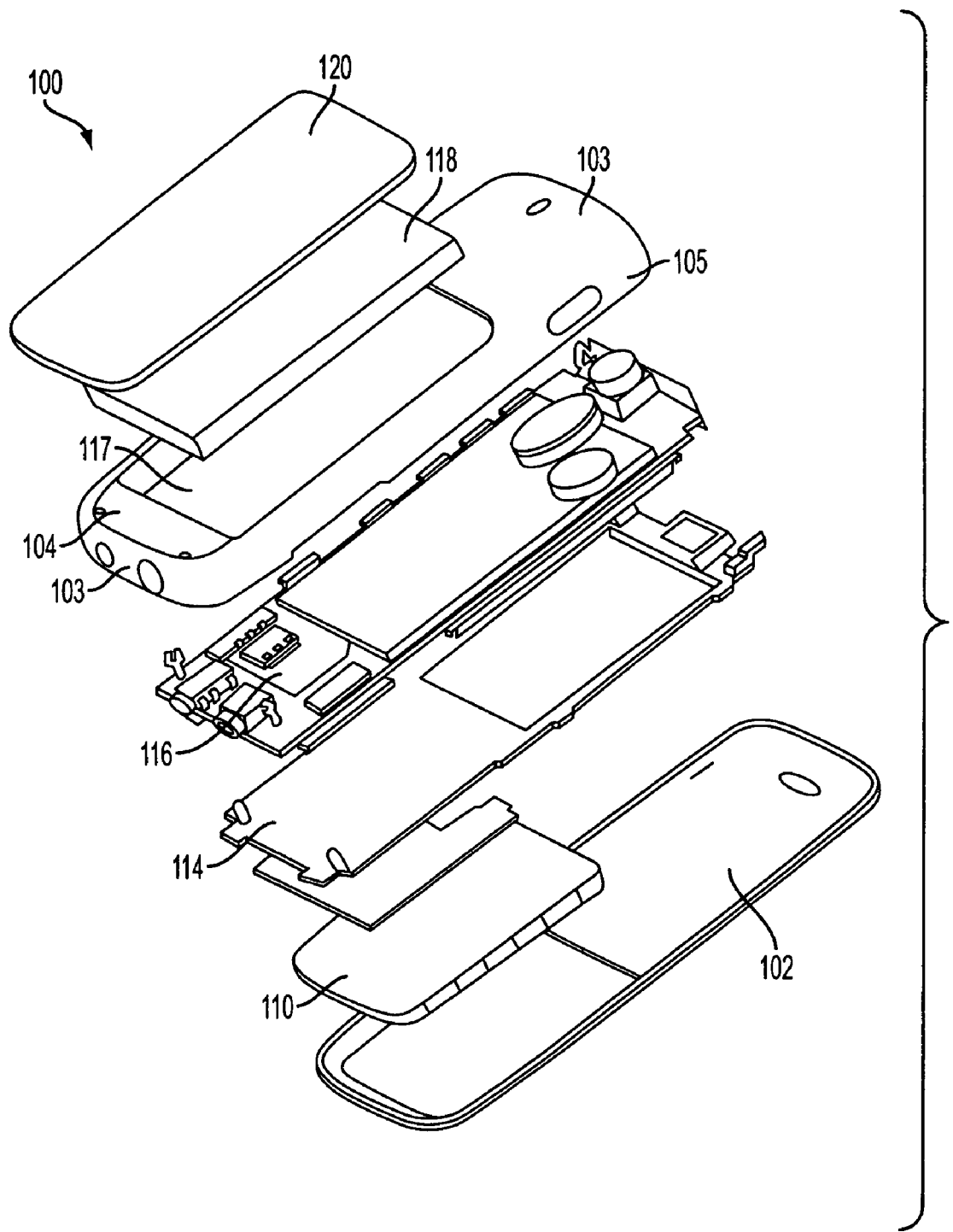
FIG. 3 is an exploded view of the handset of FIG. 1, as seen from the rear of the handset.

The handset 100 assembly also includes a back cover 104 as shown in FIG. 3. The back cover 104 may include a portion 103 generally parallel to the front cover 102, as well as side portions 105 connected to the parallel portion 103. Alternatively, the side portions 105 may be separate parts connected to the front 102 and back covers 104. The back cover 104 includes a finish similar to that of the front cover 102. For example, the same metallized thin film process may be applied to the back cover 104 as the front cover 102. This will provide a uniform appearance for the handset 100 and maintain the continuous surface from the front cover 102 to the back cover 104. Alternatively, the back cover 104 may have a metallic finish without the use of the vacuum metallized thin film. For instance, a metal sputtering process may be applied to the back cover 104 to provide a metallic finish. The metal sputtering process applies the particles of the finish to the cover 104 individually. This process provides a metallic finish similar to that produced with the vacuum metallized thin film process, however, this finish is less likely to interfere with antenna performance. In addition, the metal sputtering process is a low cost alternative to the vacuum metallized thin film process applied to the front cover 102. In an alternate arrangement, the back cover 104 may be produced using an in-mold decoration process to form the cover 104 having the desired finish.

Figure 8:
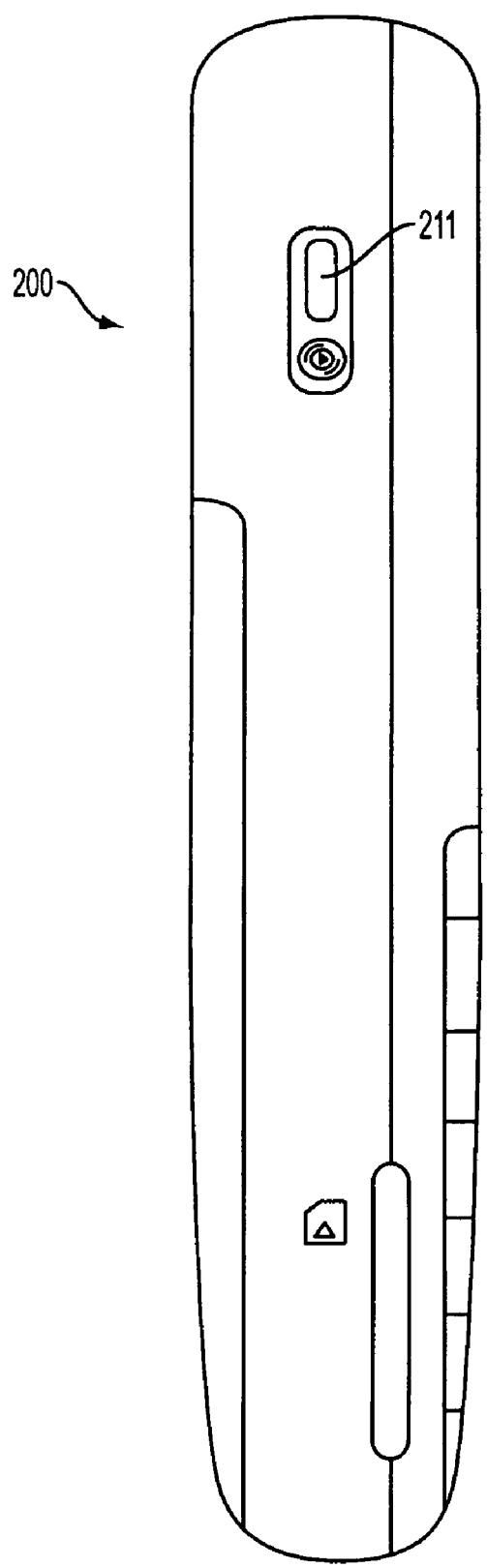
FIG. 8 is a side view of the handset of FIG. 6.

The back cover 104 also includes an opening for a light emitting element, such as a light emitting diode (LED), to emit light through the back cover 104 to indicate the status of the handset 100 (shown in FIG. 8). The opening may be formed on the flat portion of the back cover 104 or on one of the sides 105 of the cover 104. The back cover 104 may also include openings for a charging interface, as well as for a camera lens.

The battery 118 for the handset 100 is also visible in FIG. 3. The battery 118 is in contact with the printed circuit board 116 through a substantially open area 117 in the back cover 104. When assembled, the battery 118 is held in place by a battery cover 120. The exterior side of the battery cover 120 may also include the metal sputtering process applied to the back cover 104. The application of the metallic finish will provide a uniform finish for the back cover 104.

Although the handset 100 depicted is generally a candy bar-type cell phone, application of the vacuum metallized thin film finish may be applied to any type of handset, such as a clam shell-type cell phone, rotator-type cell phone, landline phone, etc. Both a clam shell handset and a rotator handset may also include a secondary display, visible when the handset is in a closed position. The secondary display may also be covered by the vacuum metallized thin film to provide a uniform metallic surface when in a standby mode and provide a visible display when the handset is in an active mode. In addition, the process may be used on other electronic devices, such as PDA's, etc.

Figure 5:
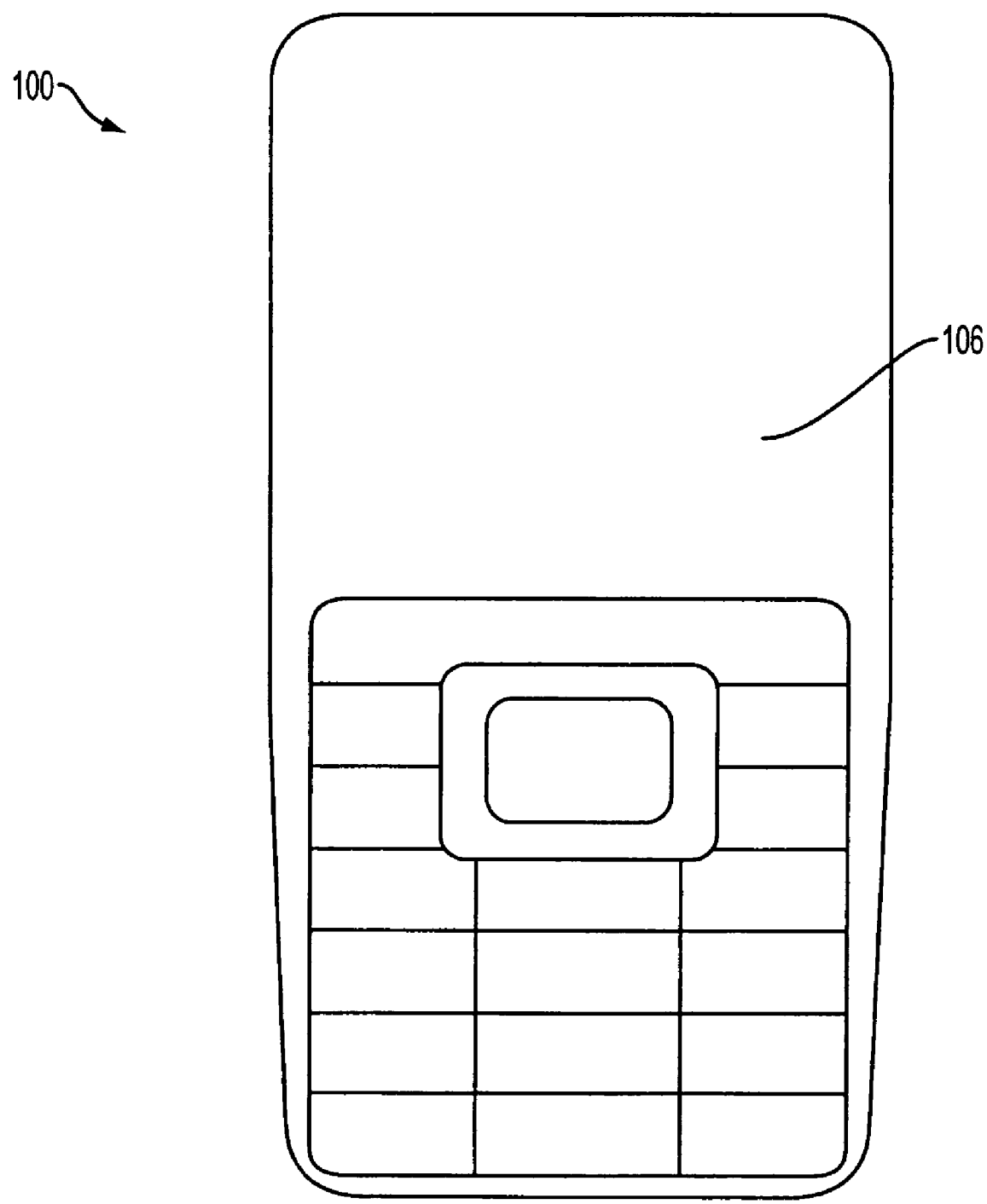
FIG. 5 is a front view of the handset of FIG. 1 as it may appear in standby mode.

The handset 100 includes at least two modes when powered on, as shown in FIGS. 4 and 5. The first mode is an active mode, shown in FIG. 4. The handset 100 may be in active mode anytime a call is being made or received. Additionally, the handset 100 may be in active mode anytime a user presses a button on the keypad 110, such as when accessing menu options, or presses the function key 112. The handset 100 is also in active mode immediately after being powered on.

When in active mode, the handset 100 maintains a continuous front surface, however the display panel 106a is visible through the display region 106. The display panel 106a is located beneath the front cover 102 in the assembled handset 100. However, the display 106a is visible through the cover 102 and the vacuum metallized thin film covering it. For example, when the handset 100 is in active mode, the display 106a within the cover 102 will be illuminated. This illumination will allow the display 106a to be visible through the clear plastic of the front cover 102 and the semi-translucent metallic finish applied to the front cover 102. In addition, the keypad indicia are also visible due to illumination of the area beneath the keypad 110 when the handset 100 is in active mode.

The handset 100 may remain in active mode for a predetermined time after the user has made a call or has pressed a button. This predetermined time may be variable and may be adjusted by the user. For instance, one user may select 15 second active mode. The handset 100 would then remain in active mode for 15 seconds after a button has been pressed. If no additional input is made to the handset 100 after 15 seconds, the handset 100 will automatically adjust to a second, standby mode. While the handset 100 is in active mode, the display 106a and the keypad indicia are visible, as they appear in FIG. 4. Once the handset 100 switches to standby mode, the display 106a and keypad indicia 110a are no longer visible. Rather, the handset 100 has a smooth, continuous surface having a metallic finish in which the display region 106 can not be differentiated from the handset 100.

FIG. 5 illustrates the handset 100 in standby mode. FIG. 5 is also illustrative of how the handset 100 may appear when powered off. When in standby mode, the display panel (106a in FIG. 4) is not visible. Rather, the display region 106 is simply a smooth, continuous surface with a metallic finish that can not be differentiated from the handset 100. In addition, the keypad indicia (110a in FIG. 4) are also not visible when in standby mode. Again, a continuous surface having a metallic finish is visible in the keypad region 110. When in standby mode, as in active mode, the handset 100 appears as one continuous surface. The vacuum metallized thin film applied to both the front cover 102 and the keypad 110 provide a metallic finish to give the handset 100 a simple, modern appearance and obscure the display panel and keypad indicia when in standby mode, while allowing them to be visible in active mode.

The handset 100 is in standby mode anytime it is not actively being used but power is on. For instance, the handset 100 may be in standby mode when the power is on yet no call is being made or received. The handset 100 may also return to standby mode while a call is in progress, after a predetermined time is reached. For example, the handset 100 may be in active mode when a call is incoming or a call is being placed. Once the connection is made, the handset 100 may remain in active mode for a predetermined amount of time, with the display panel 106a and keypad indicia 110a visible. After that time, the handset 100 may return to standby mode in which the display panel 106a and keypad indicia 110a are no longer visible. Rather the handset 100 maintains a continuous, smooth surface having a metallic finish with no differentiation between the display 106 and the handset 100.

Figure 6:
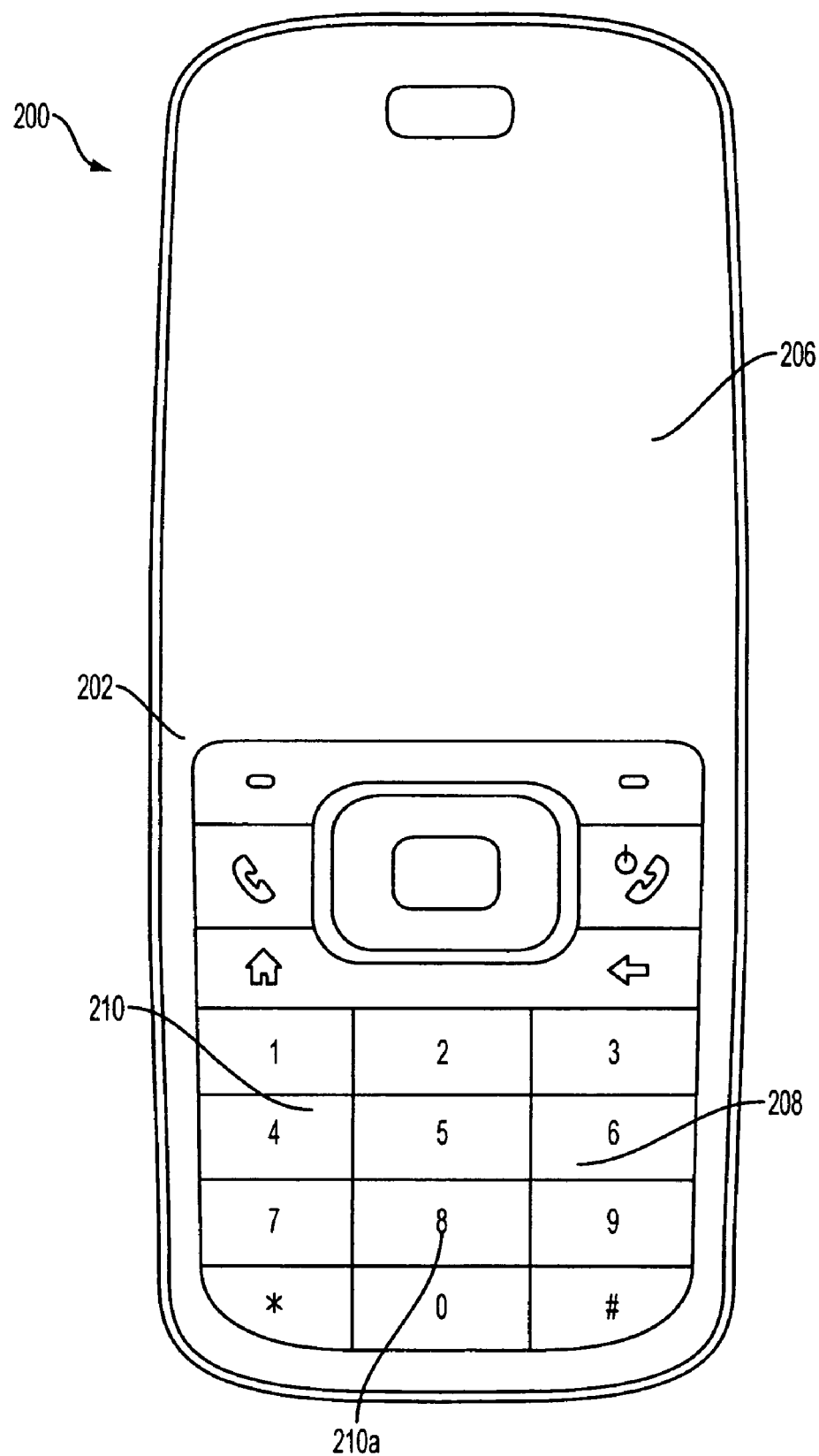
FIG. 6 is a front view another arrangement of the handset of FIG. 1, as it appears in standby mode.

FIG. 6 illustrates an alternate arrangement of the handset of FIG. 1. The handset 200 of FIG. 6 includes a front cover 202 with a display region 206 and an input region 208. The semi-translucent vacuum metallized thin film is applied to the front cover 202 to provide a mirror finish. In the example shown, the thin film provides a dark chrome finish for the handset 200.

Similar to the handset 100 of FIG. 1, the handset 200 includes an active mode and a standby mode. The standby mode is shown in FIG. 6. In this example, the display panel 206a is not visible. Rather, the display area 206 appears as one, continuous, smooth surface having a metallic finish that can not be differentiated from the handset 200. The handset 200 maintains a simple, modern appearance.

The handset 200 also includes a keypad 210 in the input region 208. The keypad 210 may be a conventional keypad with consistently visible indicia 210a. For example, the numbers on the keypad 210 are visible when the handset 200 is in either active mode or standby mode.

Figure 7:
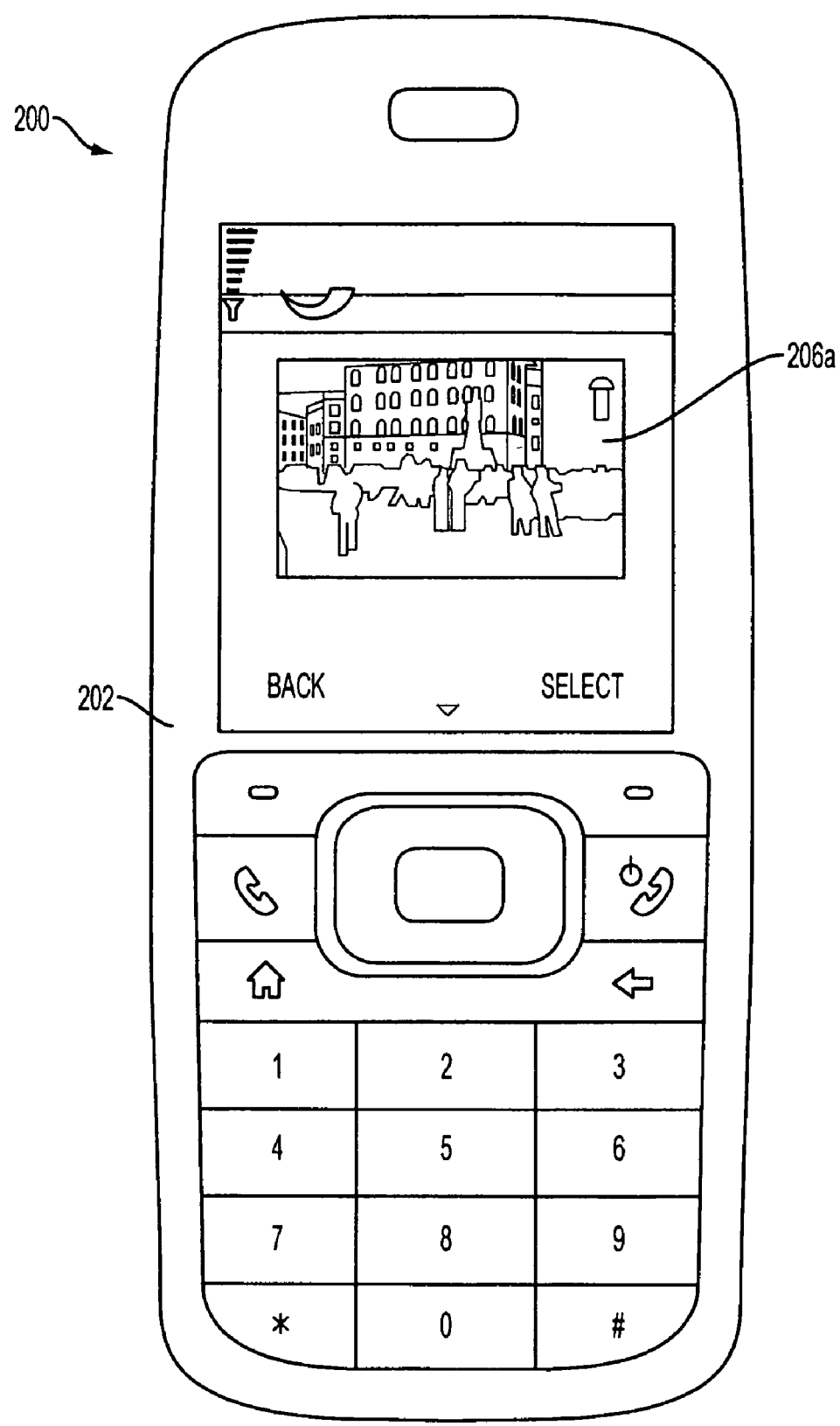
FIG. 7 is a front view of the handset of FIG. 6, as it appears in active mode.

FIG. 7 illustrates the handset 200 of FIG. 6 in active mode. The display panel 206a, located beneath the front cover 202 in the handset 200 assembly, is clearly visible through the cover 202 and the metallized thin film applied to it.

FIG. 8 is a side view of the handset 200 of FIG. 6. The handset 200 includes an opening 211 for light to be emitted, such as from an LED. This LED indicates the status of the handset 200. For example, when the handset 200 is powered on, light may be emitted from the energized LED. Alternatively, when the handset 200 is powered off no light is emitted.

Figure 9:
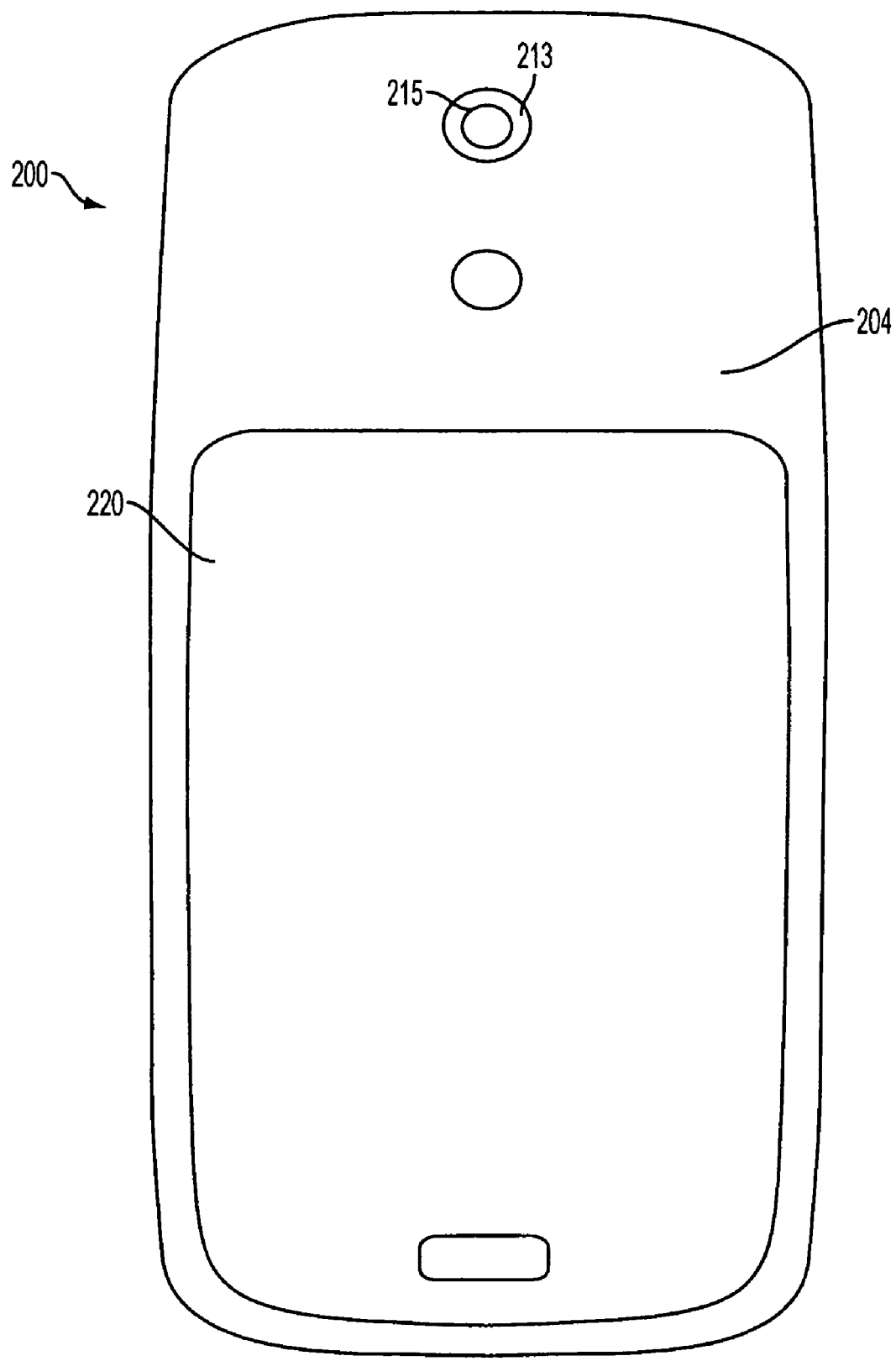
FIG. 9 is a rear view of the handset of FIG. 6.

FIG. 9 illustrates the back surface of the handset 200. The back cover 204 has a metallic finish similar or identical to that of the front cover 202. The finish on the back cover 204 may be applied using a vacuum metallized thin film, metal sputtering or in-mold decoration process. In this arrangement, the back cover 204 includes an opening 213 for a camera lens 215. Although the camera lens 215 is visible, the back cover 204 maintains a continuous appearance for the surface.

The battery cover 220 is also visible in FIG. 9. The battery cover 220 also has a metallic finish similar or identical to the back cover 204 and the front cover 202. The finish applied to the battery cover 220 may be done using a vacuum metallized thin film, metal sputtering or in-mold decoration process to provide a uniform appearance for the back of the handset 200.

FIGS. 10-14 illustrates a base unit for containing the handset. The base unit acts as a storage base that includes a cradle in which the handset nests when in day to day storage. In addition, the base unit acts as a charging unit for the handset. The case also includes a top cover that mates to the base unit for packaging or further storage of the handset.

Figure 10:
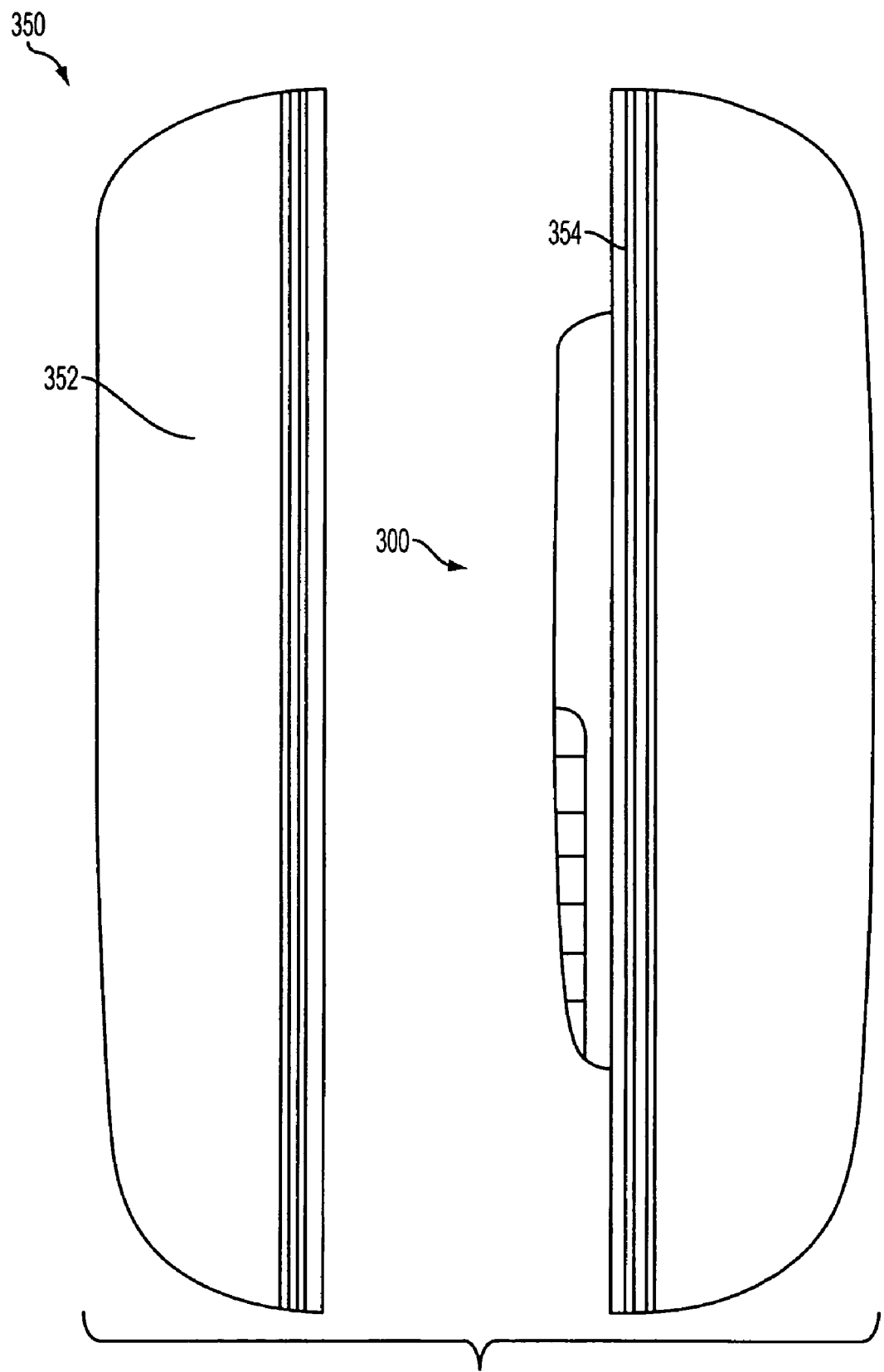
FIG. 10 depicts the base unit and top cover of a charging unit for the handset of FIGS. 1-9.
Figure 11:
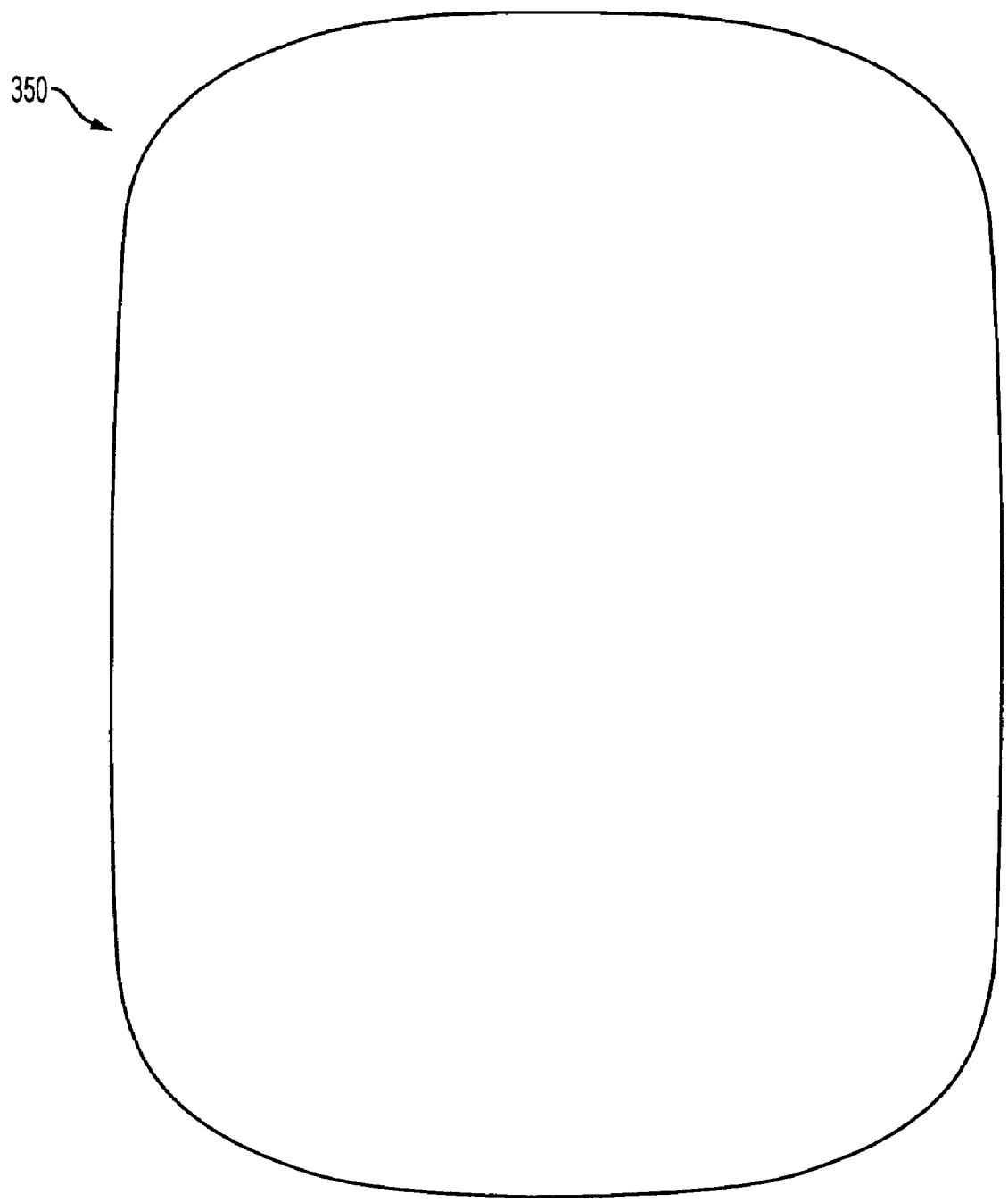
FIG. 11 is a front view of the charging unit of FIG. 10.

As shown in FIGS. 10 and 11, the case 350 includes a top cover 352 and a base unit 354. As shown, the visible exterior portion of the top cover 352 and the base unit 354 includes a metallic finish similar or identical to that of the handset 300. The finish may be applied using techniques similar to those used on the handset, such as vacuum metallized thin film, metal sputtering or in-mold injection. The metallic finish will provide a sleek, smooth continuous surface for the exterior surface of the top cover 352 and the base unit 354. In addition, it maintains the simple, modern appearance of the handset 300 sold within the case 350.

With reference to FIG. 10, the top cover 352 and base unit 354 form the case 350. The top cover 352 and base unit 354 are held together with any suitable latching or connecting mechanism that can allows relatively easy separation of the portions. For example, the top cover 352 and base unit 354 may be held together with magnets positioned within each of the portions. When properly aligned, the attractive force of the magnets will be strong enough to hold the top cover 352 and the base unit 354 together. However, the force may be easily overcome by a reasonable amount of force applied to either the top cover or the base unit to separate it from the mating half.

Figure 12:
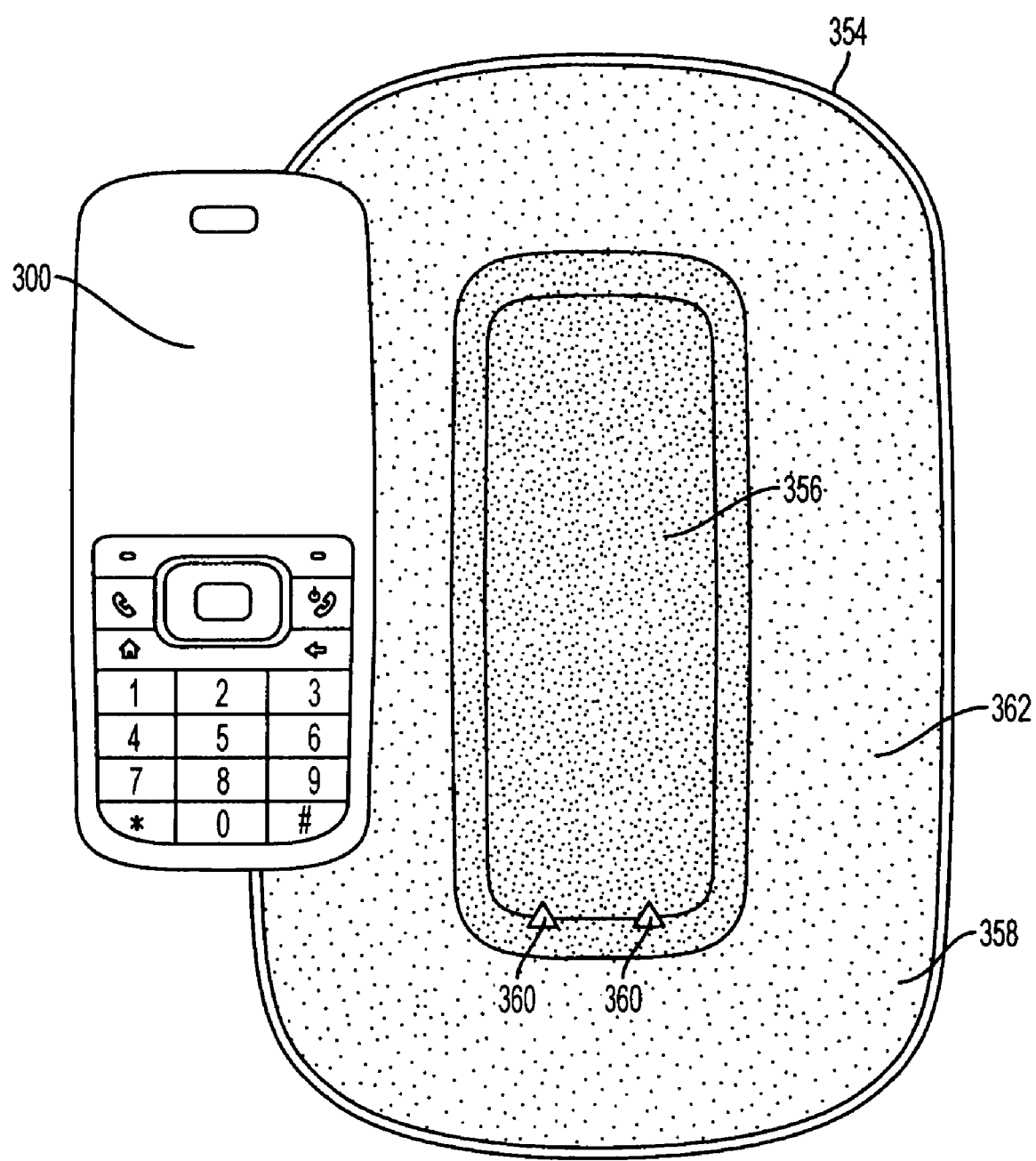
FIG. 12 depicts the interior portion of the base unit shown in FIG. 10 with one arrangement of a handset removed from the charging unit.

Further to FIG. 10, the handset 300 is visible within the base unit 354, that acts as a charging unit. As shown in FIG. 12, the base unit 354 includes a recessed area or cradle 356. When contained within the base unit 354, the handset 300 is nested within the recessed area 356 for charging or to allow the top cover 352 to align and properly mate with the base unit 354. The top cover can also be removed to allow the handset 300 to be visible within the base unit 354 when charging or when stored. The visible inner portion of the base unit 354 may include various indicia to indicate when the handset 300 is properly nested, charging or when the handset is ringing.

In one exemplary arrangement, the base unit 354 includes an outer area 358 surrounding the recessed area 356. For example, the outer area 358 may completely surround the recessed area 356. The outer area 358 may be illuminated or appear in a color when the handset 300 is properly nested within the recessed area 356. The outer area 358 may have a chrome appearance to coordinate with the handset 300 when the handset 300 is removed. For example, FIG. 12 depicts the base unit 354 with the handset 300 removed. The recessed area 356 appears as one color. The color of the recessed area 356 may remain constant regardless of the position of the handset 300. Alternatively, the color of the recessed area 356 may change or become illuminated when the handset 300 is removed. The outer area 358 has a chrome appearance to indicate that the handset 300 is not properly nested within the recessed area 356 or has been removed.

Further, the base unit 356 and the handset 300 are connected via engaging electrical signals. For example, the base unit 356 and handset 300 may include a wireless transmitter receiver system to electrically connect the base unit 356 and the handset 300.

Figure 13:
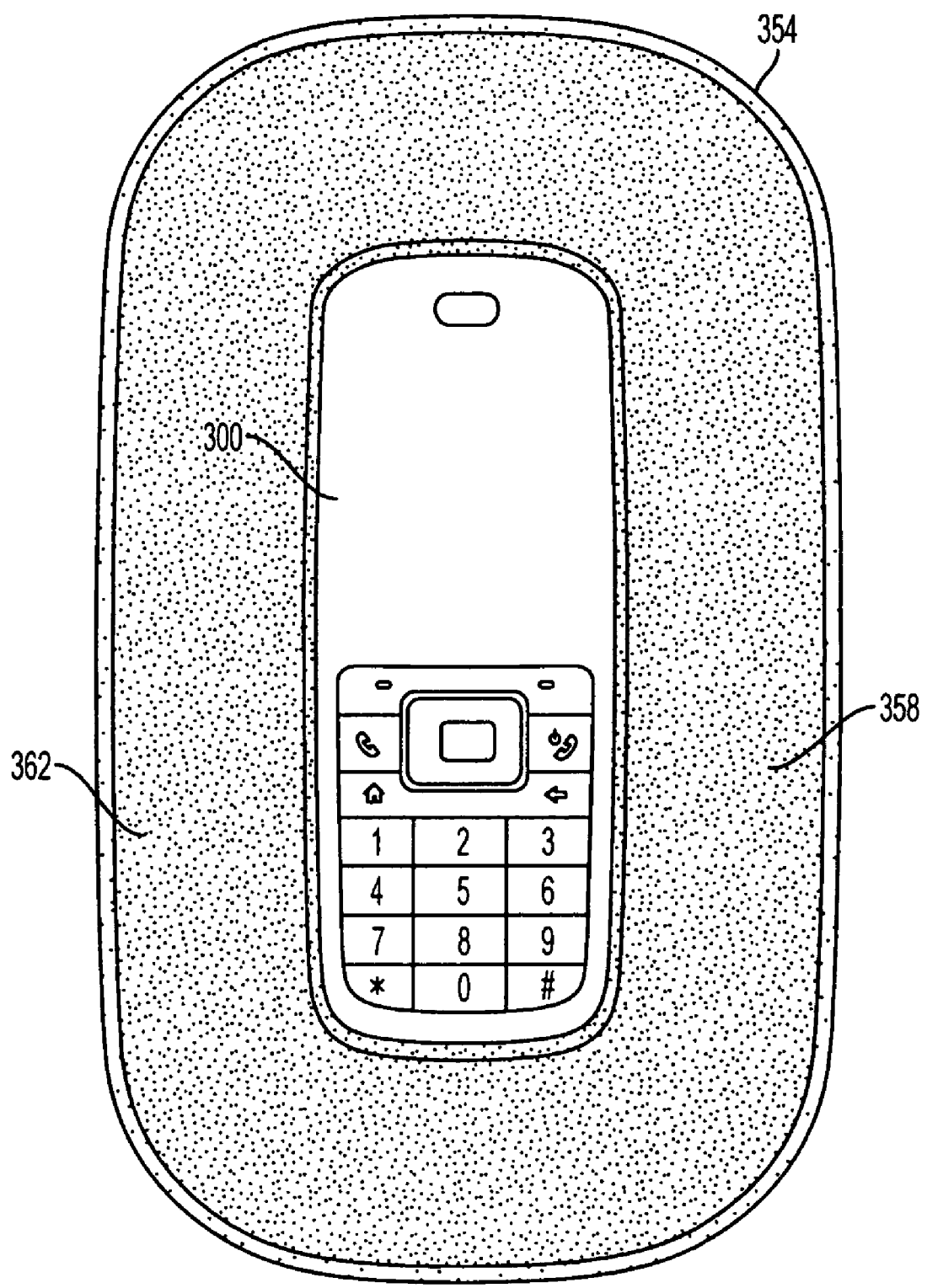
FIG. 13 depicts the base unit of FIG. 12 with the handset properly nested within the charging unit.

FIG. 13 depicts the base unit 354 with the handset 300 properly nested within the recessed area 356. The outer area 358 is illuminated and has changed from chrome, as shown in FIG. 12, to another color. The outer area 358 is essentially illuminated to indicate that the base unit 354 is in an alert state (i.e., the handset 300 is properly nested within the recessed area 356). The outer area 358 may be covered by an acrylic sheet 362. In order to illuminate the outer area 358, light emitting elements such as LED's or light-tubes are mounted within the base unit 354 beneath the acrylic sheet 362. When the handset 300 is properly nested within the recessed area 356, the LED's or light-tubes are energized and illuminate, backlighting the acrylic sheet 363 covering the outer area 358 and causing it to appear as a different color that when the handset 300 was removed. In one illustrative example, the outer area 358 is larger than the handset 300 and the illumination and/or color change of the outer area 358 provides a prominent upright backlit indicator for the base unit 354.

The outer area 358 may be appear to be any number of colors when in an alert state. For example, the color of the outer area 358 in the alert state may be determined by the color of the acrylic sheet 362 and may be selected based on a cell phone service provider's colors.

To determine when the handset 300 is nested within the recessed area 356, a weight sensor may be placed within the base unit 354, beneath the recessed area 356. The weight sensor will detect when the handset 300 is properly nested and thereby determine that the LED's or light-tubes should be energized. The weight sensor will detect when the handset 300 is removed from the recessed area 356 and thereby determine when the LED's or light-tubes should be de-energized.

Alternatively, the colors associated with the handset 300 being removed and being properly nested could be reversed. For example, when the handset 300 is properly nested within the recessed area 356, the LED's and light-tubes may not be energized to illuminate the outer area 358. Rather, the outer area 358 will have a chrome appearance to indicate that the handset 300 is properly nested. Accordingly, when the handset 300 is removed, the LED's and light-tubes will be energized and the outer area 358 will be illuminated.

In one arrangement, the base unit 354 also acts as a charging unit, in addition to simply a storage unit, for the handset. For example, the handset 300 may be placed in the recessed area 356 that may include appropriate charging connections 360. In addition, the base unit 354 includes appropriate electrical connections to be electrically coupled to a power outlet, such as a wall outlet. When the handset 300 is nested within the recessed area 356, charging will begin.

Charging the handset may be by induction. In this arrangement, a weight sensor may be placed within the base unit beneath the recessed area. This weight sensor may detect when the handset is nested within the recessed area and thereby determine when to charge the handset.

Alternatively, charging may be done via direct electrical connection between the handset 300 and the base unit 354 charging unit. For example, the handset 300 may include metal contacts on the bottom or back surface (not shown). Mating contacts (360 in FIG. 12) may be positioned within the recessed area 356 of the base unit 354. When the handset 300 is properly nested within recessed area 356, the contacts 360 will align and the handset 300 will begin charging.

Similar to the configuration discussed above, the outer area 358 may change color to indicate that the handset 300 is charging. The outer area 358 may having a generally chrome appearance when the handset 300 is not properly nested within the recessed area 356 or when the handset 300 is fully charged. The outer area 358 may illuminate and change to a different color when the handset 300 is properly nested and is charging.

In addition to changing color, the outer area may flash, blink, or the color may vary in intensity when in an alert state. This may be accomplished using multi-color LED's or light-tubes or multiple sets of LED's or light-tubes. In addition, the outer area 358 may be configured to blink or flash if the handset 300 is ringing during charging.

In addition, various rules programmed into the handset 300 may be transferred to the base unit 354. For example, when the handset 300 is stored in the base unit 354, the base unit 354 may be configured to alter the pattern of illumination, such as a change in the rate or pattern of blinking when the handset is ringing, depending on who is calling.

In another arrangement, the base unit 354 and top cover 352 can act as a packaging for sales of the handset 300. For instance, the handset may be sold within the base unit 354 and top cover 352. Additionally, the handset 300 may be displayed in the base unit 354 in the story.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Numerous other embodiments, modifications and variations within the scope and spirit of the appended claims will occur to persons of ordinary skill in the art from a review of this disclosure.

We claim:

1. A charging unit for a handset, comprising:
   a base unit, the base unit including,
      a recessed area disposed centrally within the base unit and configured for the handset to be nested within the recessed area;
      an outer area having a surface surrounding the recessed area;
      a sheet of material disposed over the surface of the outer area to cover the surface of the outer area;
      a plurality of light emitting elements arranged within the outer area and beneath the sheet of material; and
      wherein the light emitting elements are energized and de-energized to cause the sheet of material covering of the outer area to appear as a first color when the handset is nested within the recessed area and to appear as a second color when the handset is removed.

2. The charging unit of claim 1, further including a metallic finish on an exterior surface of the base unit.

3. The charging unit of claim 1, wherein the sheet of material is a colored sheet.

4. The charging unit of claim 3, wherein the light emitting elements are energized when the handset is nested within the recessed area backlighting the sheet of material.

5. The charging unit of claim 4, wherein the energized light emitting diodes emit light through the colored sheet.

6. The packaging case of claim 3, wherein the light emitting elements are not energized when the electronic device is not nested in the recessed area.

7. The packaging case of claim 3, wherein the colored sheet is an acrylic sheet.

8. A handset and charging unit having a metallic finish, comprising:
   the handset including,
      a front cover having a display region and an input region and including a semi-translucent vacuum metallized thin film layer covering a top surface of the front cover;
      wherein when the handset is operating in a first mode, the front cover has a continuous surface having a metallic finish; and
      wherein when the handset is operating in a second mode, the front cover has a continuous surface and a display panel, positioned behind the front cover, is visible through the thin film layer of the front cover;
   the charging unit for the handset including, a base unit including a recessed area disposed centrally within the base unit and configured for the handset to be nested therein, an outer area having a surface, surrounding the recessed area, and a sheet of material disposed over the surface of the outer area to cover the surface of the outer area; and
      wherein the sheet of material disposed over the surface of the outer area changes from a first color to a second color when the handset is nested within the recessed area.

9. The handset and charging unit of claim 8, further including light emitting elements arranged within the outer area and beneath the sheet of material to backlight the sheet of material over the outer area when the handset is nested within the recessed area.

10. The handset and charging unit of claim 8, further including a top cover having a metallic finish and configured to mate with the base unit.

11. The handset and charging unit of claim 8, wherein the front cover is formed of a transparent material.

12. The handset and charging unit of claim 8, wherein the display panel is illuminated when the handset is operating in the first mode and is not illuminated when the handset is operating in the second mode.

13. The handset and charging unit of claim 8, wherein the handset and base unit are connected via engaging electrical signals.

14. The handset and charging unit of claim 8, wherein the outer area is larger than the handset.

15. The handset and charging unit of claim 14, wherein the base unit is configured to store the handset when not charging.

16. A charging unit for a handset, comprising:
   a base unit having an exterior surface with a metallic finish and including,
      a recessed area disposed centrally within the base unit and configured for the handset to nest within;
      an electrical contact positioned within the recessed area and configured to charge the handset when the handset is nested within the recessed area;
      an outer area having a surface surrounding the recessed area;
      an outer area having a surface surrounding the recessed area; and
      a sheet of material disposed over the surface of the outer area to cover the surface of the outer area;
      wherein the sheet of material disposed over the surface of the outer area changes from a first color to a second color when the handset is nested within the recessed area.

17. The charging unit for a handset of claim 16, further including a plurality of light emitting elements arranged within the outer area and beneath the sheet of material, the light emitting elements being configured to backlight the outer area.

18. The charging unit for a handset of claim 17, wherein the light emitting elements are configured to blink in a first pattern when the handset is ringing.

19. The charging unit for a handset of claim 17, wherein the light emitting elements are configured to blink-in a second pattern according to a rule established in the handset.

20. The charging unit for a handset of claim 19, wherein sheet of material is a removable colored sheet disposed over the light emitting elements arranged within the outer area.

* * * * *